Feb. 11, 1936.  H. SERISKY  2,030,407

BABY CARRIAGE

Filed Feb. 6, 1935

HARRY SERISKY
INVENTOR.

BY Joseph Blaeker
ATTORNEY

Patented Feb. 11, 1936

2,030,407

UNITED STATES PATENT OFFICE 2,030,407

BABY CARRIAGE

Harry Serisky, Brooklyn, N. Y.

Application February 6, 1935, Serial No. 5,161

2 Claims. (Cl. 280—47)

This invention relates to baby carriages and cribs, and an object of this invention is to provide a combination baby carriage and crib composed of independent baby carriage and crib units adapted to operate in unison or independently, and the said carriage having concealable hoods.

Another object of this invention is to provide a baby carriage having two telescopically collapsible cooperating hoods, one hood being impervious to sunlight and the other hood being translucent and adapted to be independently adjusted and automatically locked relatively to each other above the top surface of the carriage so as to shade the eyes of the baby from glaring sunlight while permitting rays of light all over the body of the baby.

Another object of this invention is to provide two U-shaped telescopically collapsible hoods relatively and independently adjustable over the top surface of a baby carriage, the hoods being jointly adapted to keep the wind and rain away from the baby while permitting sunlight substantially all over the body of the baby.

Another object of this invention is to provide a combination baby carriage and crib composed of independent units and forming a continuous air passage all around the crib when the crib is mounted on a supporting frame in operating relation in the carriage.

Another object of this invention is to incorporate glass-like material in the translucent hood, the said material being adapted to permit ultraviolet rays from the sun to enter the carriage.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

Figure 1:
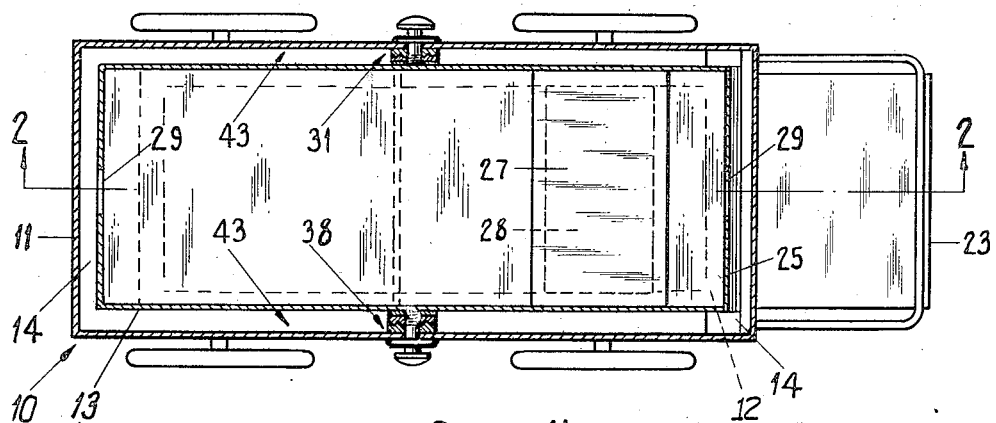
Figure 1 is a top plan view of the combined baby carriage and crib.
Figure 2:
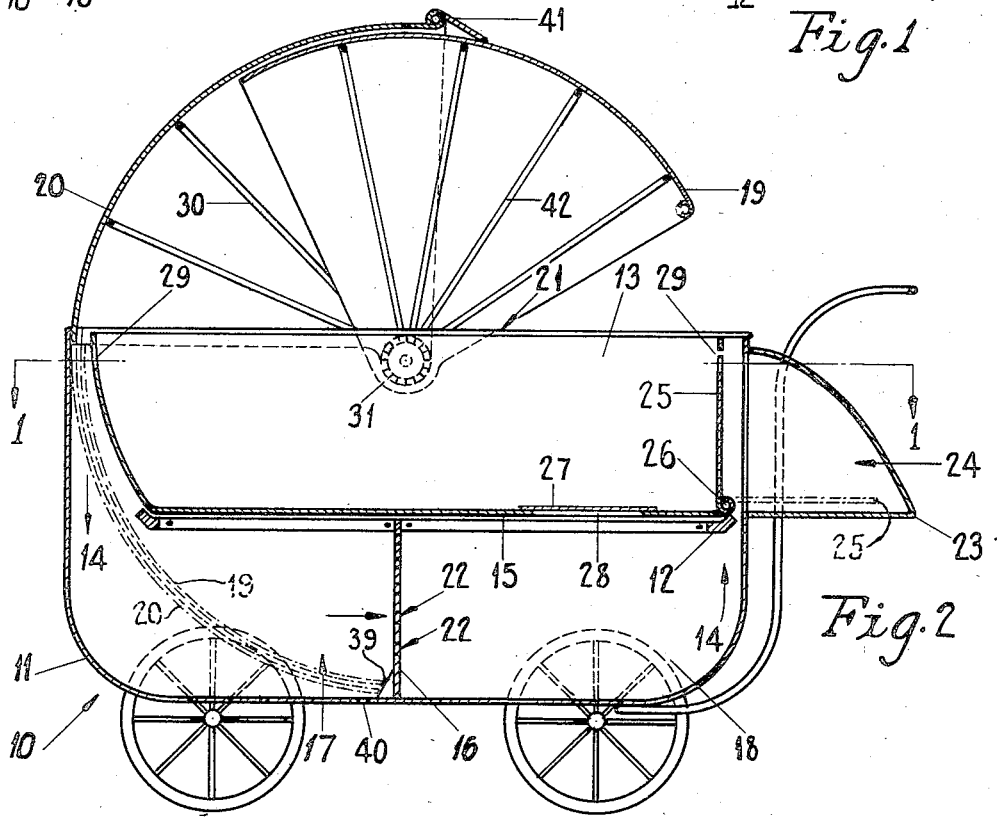
Figure 2 is a central vertical longitudinal section, the section being taken as on line 2—2 in Figure 1.

In the illustrated embodiment of the invention, Figures 1 and 2 show an assembled combination baby carriage and removable crib 10, comprising a baby carriage body 11, having therein a hollow frame 12 fixed to said body and designed to support a crib 13 centrally of the baby carriage and so positioned that a continuous air circulation passage 14 is provided all around the sides and below the bottom 15 of the crib 13.

Below the crib 13 is a large space which is divided by a partition 16 into a front storage compartment 18 for blankets, etc., and a rear compartment or space 17 designed to receive two rotatably mounted and telescopically collapsible hoods 19 and 20 in concealment below the top surface 21 of the carriage 11. A slidable closure member 27 may be placed in the crib 13 over an opening 28 in the bottom of the crib. The closure member 27 may thus be moved away to clear the opening 28 so that the storage compartment 18 becomes accessible to the user when the crib is in operative position in the carriage 11. Openings 29 providing handholds in both ends of the crib serve for removing and replacing the crib in the carriage. The partition 16 has perforations 22 permitting passage and circulation of air between the compartments 17 and 18.

The baby carriage 11 has been formed at its front end with an extension 23 which may be opened up, as shown in Figure 2, to provide a space 24 for the feet of the baby to allow for growing. The crib 13 has been formed with a closure member 25 pivotally mounted at 26 so that the closure may be swung down to the dot-and-dash line position into the space 24 to cooperate therewith, or to be swung up in an upright position when the crib 13 may be removed from the carriage.

Figure 3:
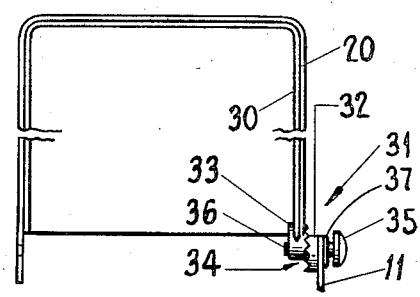
Figure 3 is a side elevation of one of the hoods.

As shown in Figure 3, the textile hood 20 is U-shaped and has reinforcing ribs 30. A gear or gear device 31 comprising one member 32 fixed to the carriage 11 and the other member 33 fixed to one side wall of the hood 20. Interlocking teeth 34 on each of the gear members 32 and 33 serve for adjusting the hood 20 in any position above, or into concealment below the top surface 21 of the carriage 11. It is to be noted that a knob 35 having an integral threaded extension 36 passes through apertures in the ratchet members 32 and 33 and that a spring 37 positioned between the knob 35 and the carriage 11 serves to bring the gear teeth together in interlocking engagement and that the user may swing the hood 20 up or down while the spring moves to and from the carriage and permits the gear teeth to go in and out of engagement and automatically lock the hood 20 in all operating positions.

Gear means 38 similar to the gear device 31 is secured to one side wall of the translucent hood 19, which may thus be raised or lowered into any desired position above or independently of the hood 20 into concealment below the top surface 21 of the carriage 11. The translucent material on the hood 19 extends all around on all three sides and permits sunlight to pass through. Ribs 42 similar to the ribs 30 may be used to reinforce the hood 19. The textile fabric on the hood 20 extends all around on all three sides and is impervious to sunlight. From the above, it will be seen that it is possible to adjust the textile hood 20 above the top surface 21 of the carriage 11 and that the translucent hood 19 may then be swung and raised above the top surface 21 of the carriage 11 so that while the glaring rays of the sun are kept away from the eyes of the baby the said rays will be active all over the body of the baby while the said hoods will protect from rain and wind. It is to be noted that the hood 19 may be of glass-like translucent material designed to transmit ultra-violet rays of the sun so that babies afflicted with such ailments as rickets, etc., may be cured by said rays.

As shown in Figure 2, a stop 39 on the bottom of the baby carriage 11 serves to limit the downward swing of the hoods 19 and 20 below the top surface 21 of the carriage so that the upper ends of the hoods may be gripped for raising above the carriage. A plurality of drain holes 40 at the bottom of the carriage serve for drainage of any rain drops that may leak over the sides of the hoods. A yieldable transverse member 41 may be pivotally secured at one end of the hood 20 to act as a sun visor or as a weather strip to prevent rain or snow from passing between the two hoods 19 and 20 into the carraige 11.

Referring to Figures 1 and 2 it will be seen that an air space 43 has been provided all around the crib 13. The air in the space 43 being a poor conductor of heat will tend to control the temperature around the crib.

It will thus be noted that there has been provided a baby carriage and crib having walls spaced apart all around and having two independently adjustable U-shaped hoods, each of a quadrant of a circle, formed with integral sides and top members and which are completely concealable below the top of the carriage when in inoperative position. It is also to be noted that the two hoods are formed with contrasting materials, one being impervious to sunlight and the other being translucent.

I claim:

1. A baby carriage and crib of the character described, comprising in combination, a carriage body having a frame fixed thereto above the carriage floor and horizontally therein, a removable baby crib mounted on said frame and spaced away from said floor, an apertured vertical wall between said crib and carriage floors forming storage compartments therebetween, said crib being mounted centrally in said carriage and forming a continuous circulation passage around the sides and below the bottom of said crib and through said storage compartments.

2. A baby carriage and crib of the character described, comprising in combination, a carriage body having a frame fixed thereto above the carriage floor and horizontally therein, a removable baby crib mounted on said frame and spaced away from said floor and forming storage space between said crib and carriage floors, said crib being mounted centrally in said carriage and forming a continuous air circulation passage around the sides and below the bottom of said crib and through said storage space, the walls of said carriage and crib bodies being sufficiently spaced apart to permit sections of hoods to enter therebetween.

HARRY SERISKY.